United States Patent
Mählmann et al.

(10) Patent No.: US 8,348,541 B2
(45) Date of Patent: Jan. 8, 2013

(54) JOINT ARRANGEMENT FOR A VEHICLE

(75) Inventors: Dirk Mählmann, Vechta (DE);
Benjamin Ziebart, Wallenhorst (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 372 days.

(21) Appl. No.: 12/295,335

(22) PCT Filed: May 8, 2007

(86) PCT No.: PCT/DE2007/000843
§ 371 (c)(1),
(2), (4) Date: Sep. 30, 2008

(87) PCT Pub. No.: WO2007/128300
PCT Pub. Date: Nov. 15, 2007

(65) Prior Publication Data
US 2009/0208273 A1    Aug. 20, 2009

(30) Foreign Application Priority Data
May 9, 2006    (DE) .......................... 10 2006 021 862

(51) Int. Cl.
*F16C 11/00* (2006.01)
(52) U.S. Cl. ..... 403/122; 403/134; 74/422; 280/93.514; 180/428
(58) Field of Classification Search .............. 403/50–51, 403/122–144; 74/18, 18.1, 18.2, 492, 493, 74/422; 280/93.511, 93.514, 93.515; 180/428
See application file for complete search history.

(56) References Cited

U.S. PATENT DOCUMENTS

| | | | |
|---|---|---|---|
| 5,499,550 A * | 3/1996 | Westphal et al. | 74/422 |
| 5,890,394 A * | 4/1999 | Anderson | 74/422 |
| 6,579,025 B1 * | 6/2003 | Sokolihs et al. | 403/44 |
| 6,598,697 B2 * | 7/2003 | Oishi | 180/428 |
| 7,461,571 B2 * | 12/2008 | Tanaka | 74/388 PS |
| 2002/0017419 A1 * | 2/2002 | Oishi | 180/426 |

FOREIGN PATENT DOCUMENTS

| | | |
|---|---|---|
| DE | 43 31 291 C1 | 12/1994 |
| JP | 63-104173 | 7/1988 |
| JP | 63104173 U * | 7/1988 |
| JP | 3-8066 | 1/1991 |
| JP | 5-37644 | 2/1993 |
| JP | 11 342854 | 12/1999 |
| JP | 2002 372035 | 12/2002 |

\* cited by examiner

*Primary Examiner* — Daniel P. Stodola
*Assistant Examiner* — Eric Chau
(74) *Attorney, Agent, or Firm* — McGlew and Tuttle, P.C.

(57) ABSTRACT

Joint arrangement for a vehicle, with a joint (7), which has a joint housing (8) and a pivot pin (9) mounted movably in relation thereto; a rod (4), which has a cavity (6) and which is connected to the joint (7); a ring element arranged between the joint and the rod; a sealing bellows (10), which defines the interior space (11) and in which the joint (7) is arranged at least partially; and a gas-permeable connection (13), which connects the cavity (6) of the rod (4) to the interior space (11) of the sealing bellows (10), wherein at least part of the gas-permeable connection (13) is formed by at least one groove, which is formed on the ring element and opens into the interior space (11) of the sealing bellows (10).

20 Claims, 4 Drawing Sheets

JOINT ARRANGEMENT FOR A VEHICLE

CROSS REFERENCE TO RELATED APPLICATIONS

This application is a United States National Phase application of International Application PCT/DE 2007/000843 and claims the benefit of priority under 35 U.S.C. §119 of German Patent Application DE 10 2006 021 862.0 filed May 9, 2006, the entire contents of which are incorporated herein by reference.

FIELD OF THE INVENTION

The present invention pertains to a joint arrangement for a vehicle, with a joint, which has a joint housing and a pivot pin mounted therein movably relative to said joint housing; with a rod, which has a cavity and which is connected to the joint; with a ring element arranged between the joint and the rod; with a sealing bellows, which defines an interior space and in which the joint is arranged at least partially; and a connection, which is permeable to gases and connects the cavity of the rod to the interior space of the sealing bellows.

BACKGROUND OF THE INVENTION

Such joint arrangements are known from the state of the art and are used, e.g., for rack-and-pinion steerings, wherein the sealing bellows protects at least part of the joint arrangement from environmental effects and dirt. Pressure fluctuations, which can be compensated via the gas-permeable connection, may occur within the sealing bellows during motions of the toothed rack.

A connection between a hollow rod and a housing is known from JP 5-37644, wherein a groove is provided in the wall of the rod on the front side. Furthermore, two mutually opposite grooves are formed on the inner wall of the rod in the area of a thread.

A hinge joint with a ball and socket joint housing, which is connected to an axial connection pin, which has an external thread and is screwed into a hollow toothed rack with a corresponding internal thread, is known from DE 43 31 291 C1.

After it has been mounted, the toothed rack is in contact with a radial flange, into which the connection pin passes over on the ball and socket joint housing side. Vent grooves, which pass over into the radial flange, are provided in the connection pin.

The drawback of this solution is that the radial areas of the vent grooves extend in the front surface of the radial flange, which can also be used at the same time as a support surface when the joint is pressed together. This surface is reduced by the vent grooves, which in turn leads to restrictions in design.

JP 3-8066 discloses a ball and socket joint, whose housing bottom has an axially offset flange with an axially projecting pin, which meshes with a hollow rod. Radial grooves, which pass over into axial grooves, which are formed in the jacket surface of the pin, are provided in the flange provided with a wrench surface.

JP 63-104173 discloses a joint arrangement with a joint, which is connected by means of a pin to a hollow rod by means of a screw connection. An axial groove, which extends in a thread and passes over into a radial groove formed in a radial flange of the pin, is formed in the pin, and a ring element is arranged between the radial flange provided with a wrench surface and the rod.

The drawback of the latter two solutions is that grooves combined with wrench surfaces form complicated contours, on which burs or increased tool wear may occur. Furthermore, the sealing bellows according to JP 63-104173 may get caught at the ring element and become damaged as a result.

SUMMARY OF THE INVENTION

Based on this state of the art, the basic object of the present invention is to perfect the joint arrangement mentioned in the introduction such that restrictions in design can be reduced and grooves in wrench surfaces can be avoided.

The joint arrangement according to the present invention for a vehicle, especially a motor vehicle, has a joint, which comprises a joint housing and a pivot pin mounted movably relative to this; a rod, which has a cavity and which is connected to the joint; a ring element arranged between the joint and the rod; a sealing bellows, which defines an interior space and in which the joint is arranged at least partially; and a gas-permeable connection, which connects the cavity of the rod to the interior space of the sealing bellows, wherein at least part of the gas-permeable connection is formed by at least one groove, which is formed on or in the ring element and opens into the interior space of the sealing bellows.

Since the gas-permeable connection opens according to the present invention into the interior space of the sealing bellows via the groove formed in the ring element, the provision of air passage grooves in a front surface of the joint, which front surface faces the rod, in a connection area between the joint and the rod can be avoided. Since, furthermore, the ring element forms a separate component arranged between the joint and the rod, it is likewise possible to avoid the use of a gas-permeable connection passing through a wrench surface. In particular, the ring element is arranged in the interior space defined by the sealing bellows.

The ring element has an edge, which encloses a recess extending through the ring element. The ring element may be designed as a ring or as a sleeve, which usually has a greater longitudinal extension than a ring. However, the ring element is preferably designed as a ring disk. Furthermore, the ring element may have a round or circular outer circumferential contour. It is likewise possible for the recess extending through the ring element to be designed as a round or circular recess.

The groove may open into the recess extending through the ring element. In particular, the groove is formed in a front side of the ring element and preferably extends from the inner, continuous ring recess up to the jacket surface of the ring. The groove may be formed in a front side of the ring element, which said front side faces the rod, so that the gas-permeable connection is kept as short as possible. Furthermore, a plurality of grooves may be formed on the ring element.

The rod may be connected to a pivot pin, so that the ring element is arranged between the rod and the pivot pin and, for example, sits on this pivot pin. However, the rod is preferably connected to the pivot pin, in which case the ring element is arranged between the joint housing and the rod and is in contact, in particular, with the joint housing and/or the rod. With a front side facing the joint housing, the ring element may be in contact with a front side of the joint housing, which said front side faces the rod. Furthermore, the ring element may be in contact by a front side facing the rod with a front side of the rod, which said front side faces the joint housing.

The ring element may have an external diameter that is smaller than or equal to the external diameter of the joint housing. In particular, the ring element has the same external diameter as the rod. The risk that the sealing bellows will get caught at the ring and is damaged as a result can thus be reduced.

The front side of the joint housing, which said front side faces the rod, may be provided at a housing bottom, which is made, in particular, in one piece with the joint housing. Furthermore, the joint housing preferably has a housing recess, which is defined by a wall of the housing and in which the pivot pin is seated. The bottom may face away from an opening of the housing or be located opposite same, through which said opening the pivot pin mounted in the joint housing extends from the joint housing.

The joint housing preferably has an axial pin, which is made especially in one piece with same and which meshes with the cavity of the rod. The ring element can be pushed over or be seated on the axial pin in this case, so that the axial pin extends through the continuous recess provided in the ring element. The pin is preferably provided with an external thread and is screwed into the rod, which has especially an internal thread for this, which meshes with the external thread. The pin may be connected to the bottom and made in one piece with same.

The gas-permeable connection preferably has at least one second groove, which joins the groove at least indirectly and which extends within the rod at least in some areas or completely and opens into the cavity of the rod. The two grooves are in connection with one another in a gas-permeable manner especially within or in the area of the continuous recess formed in the ring element, and this recess or a part thereof may be inserted.

The second groove may be formed on the inner wall of the rod. However, since the joint housing preferably has the pin meshing with the interior space, the second groove can also be formed in the jacket surface of that pin. The second groove extends now, e.g., from an end of the pin, which faces away from the joint housing and is especially a free end, to the ring element or beyond. If the joint and the rod are screwed together, the second groove preferably extends in or in the area of the external thread of the pin or of the internal thread of the rod. Furthermore, a plurality of grooves may be formed on the pin and/or on the inner wall of the rod.

The (first) groove formed in the ring element and the second groove do not extend, in particular, in parallel to one another. The second groove preferably extends in the direction of or in parallel to a longitudinal direction of the rod (axial direction), whereas the first groove may extend transversely, especially at right angles to this longitudinal direction (radial direction). Furthermore, a helical course of the first and/or second groove is possible.

The rod may be connected to a steering gear and moved by means of the steering gear, especially displaced in the longitudinal direction of the rod. The rod is preferably designed as a toothed rack, which forms a rack-and-pinion steering or a rack-and-pinion steering gear together with the steering gear. The sealing bellows may be sealingly in contact with the steering gear or a housing of the steering gear, on one hand, and with the pivot pin or with a coupling member connected to same, on the other.

The joint is preferably a ball and socket joint, so that the pivot pin is designed as a ball pivot, which is mounted with its joint ball rotatably and pivotably in the joint housing.

The cavity formed within the rod extends especially in the longitudinal direction of the rod and preferably extends up to the front side of the rod, which front side faces the joint. The cavity may be axially limited or designed as a blind hole within the rod. As an alternative, the cavity may extend through the rod. Furthermore, a plurality of cavities may be provided in the rod.

It is likewise possible for the rod to be connected to a second joint and to extend between these two joints. A ring element each with a groove opening into the interior space may be arranged now between the joints and the rod, the two joints being especially of the same design.

Since the grooves described here are part of a gas-permeable connection or form same, they are preferably free grooves.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
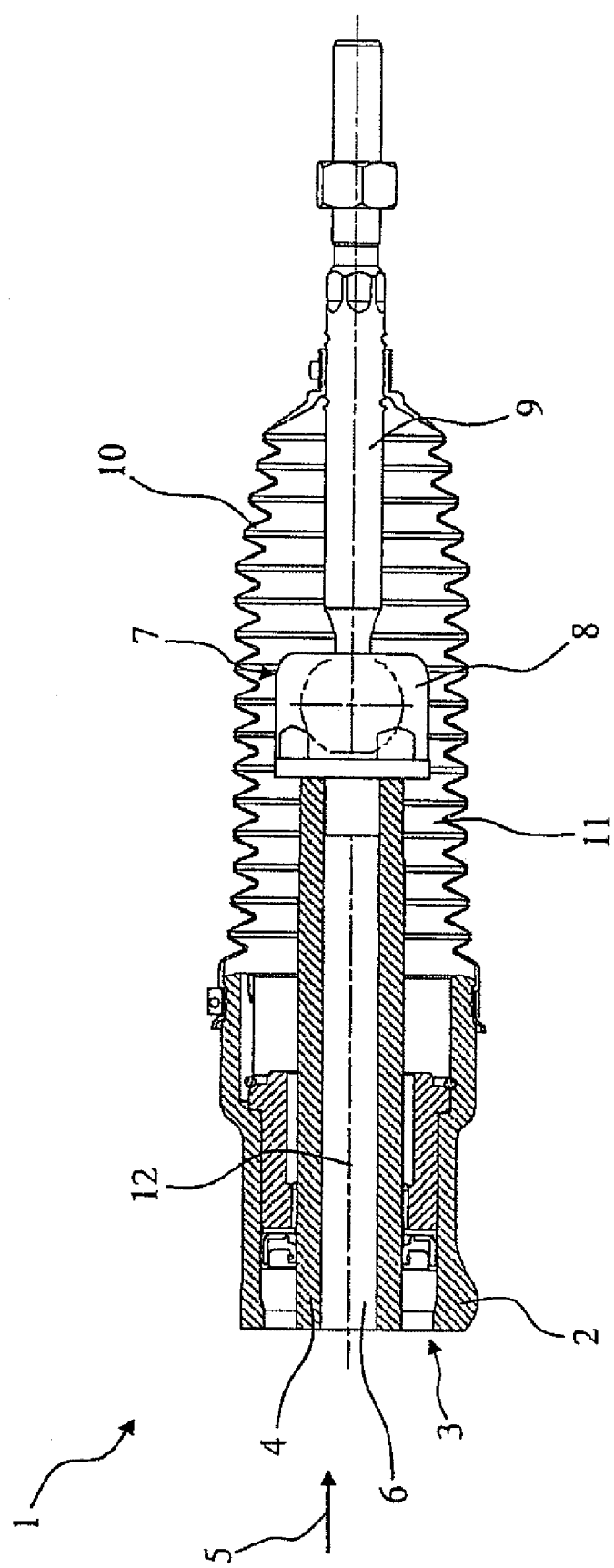
FIG. 1 is a partially cut-away view of a rack-and-pinion steering.

Referring to the drawings in particular, FIG. 1 shows a partially cut-away view of a rack-and-pinion steering 1, in which a toothed rack 4, which can be displaced by means of a steering gear 3 in the direction of arrow 5 and in the direction opposite arrow 5, is mounted in a housing 2 of a steering gear 3. The toothed rack 4 has a recess 6 and is connected at one end to a ball and socket joint 7. The ball and socket joint 7 has a joint housing 8 and a ball pivot 9, which is mounted rotatably and pivotably in same and which is seated with a joint ball 18 (see FIG. 2) in a recess 16 of the housing (see FIG. 2), which recess is formed in the joint housing 8, and is defined by a wall 17 (see FIG. 2) of the joint housing 8. The ball pivot 9 extends through an opening 19 provided in the ball and socket joint housing 8 (see FIG. 2) and protrudes from same, and a sealing bellows 10 is in contact with one end with the ball pivot 9 outside the ball and socket joint housing 8. With its other end, the sealing bellows 10 is sealingly in contact with the housing 2 of the steering gear 3, so that an interior space 11, which is defined by the sealing bellows 10 and in which the ball and socket joint housing 8, an end area of the toothed rack 4 as well as a part of the ball pivot 9 are arranged, is formed between the two ends of the sealing bellows 10. The longitudinal axis of the toothed rack 4 is designated by reference number 12, and arrow 5 extends in parallel to or in the direction of the longitudinal axis 12.

If the toothed rack 4 is displaced by means of the steering gear 3 in the direction opposite arrow 5, the sealing bellows 10 is compressed or flattened, which may lead to an increase in the pressure of the air present in the interior space 11 of the sealing bellows 10. If, by contrast, the toothed rack 4 is displaced by means of the steering gear 3 in the direction of arrow 5, the sealing bellows 10 designed as a bellows is stretched or expanded, which may lead to a drop in the pressure of the air present in the interior space 11 of the sealing bellows 10. To enable such pressure fluctuations to be compensated, the rack-and-pinion steering 1 has a gas-permeable connection 13 (see FIG. 2), which connects the cavity 6 of the toothed rack 4 to the interior space 11 of the sealing bellows 10 in such a way that air can flow through. Thus, air can be removed through the cavity 6 from the interior space 11 or air can be fed into the interior space 11. If the cavity 6 does not extend through the entire toothed rack 4, the air can be bypassed, e.g., via the housing 2 of the steering gear 3.

Figure 2:
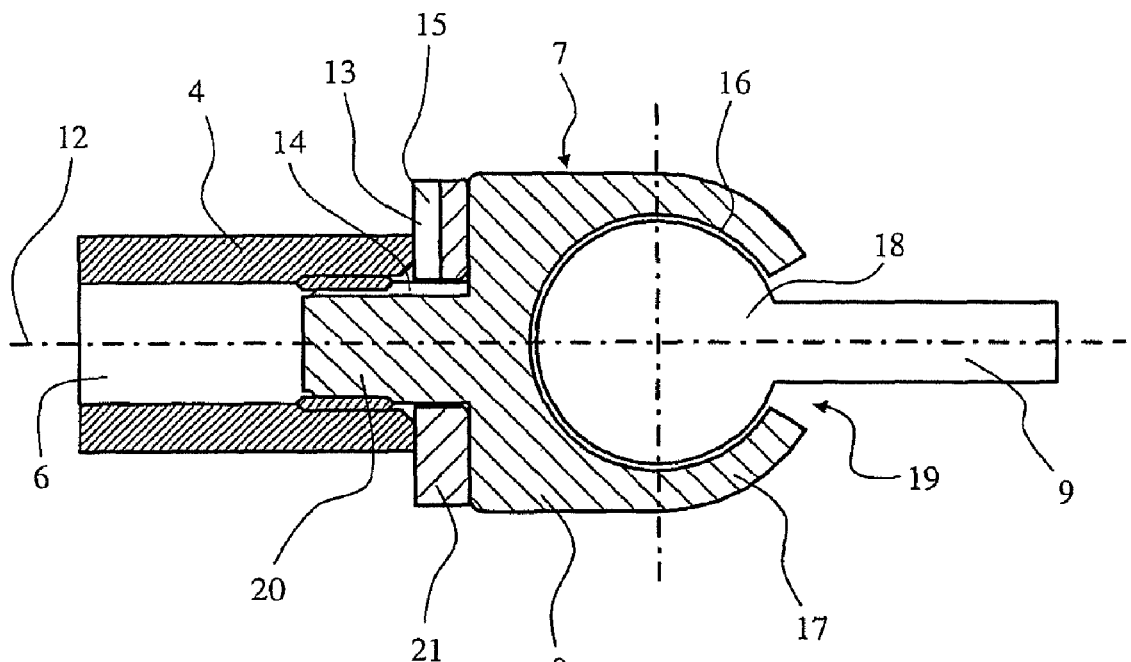
FIG. 2 is a sectional view of a ball and socket joint for the rack-and-pinion steering according to one embodiment of the present invention.

FIG. 2 shows the ball and socket joint 7 of the rack-and-pinion steering 1 according to one embodiment of the present invention in a sectional view, wherein the cavity 6 is connected to the interior space 11 of the sealing bellows 10, not shown here, which said interior space 11 is arranged outside the ball and socket joint housing 8, via the gas-permeable connection 13 in such a way that air can flow through.

The joint housing 8 has an axial pin 20, which is made especially in one piece with same and which is provided with an external thread and meshes with the cavity 6 of the toothed rack 4. An internal thread, which meshes with the external thread of the pin 20, is formed here in the area of the end of the toothed rack 4, which end faces the ball and socket joint 7, on the inner wall of the toothed rack 4. The ball and socket joint housing 8 and the toothed rack 4 are thus connected to one another by means of a screw connection.

A ring 21, which is designed especially as a ring disk and which is pushed over the pin 20 or is seated on same, is arranged between the ball and socket joint housing 8 and the toothed rack 4, the ring 21 being in contact with the joint housing 8 by a front side facing the joint housing 8. Furthermore, the ring 21 is in contact with the toothed rack 4 by a front side facing the toothed rack 4.

Figure 4:
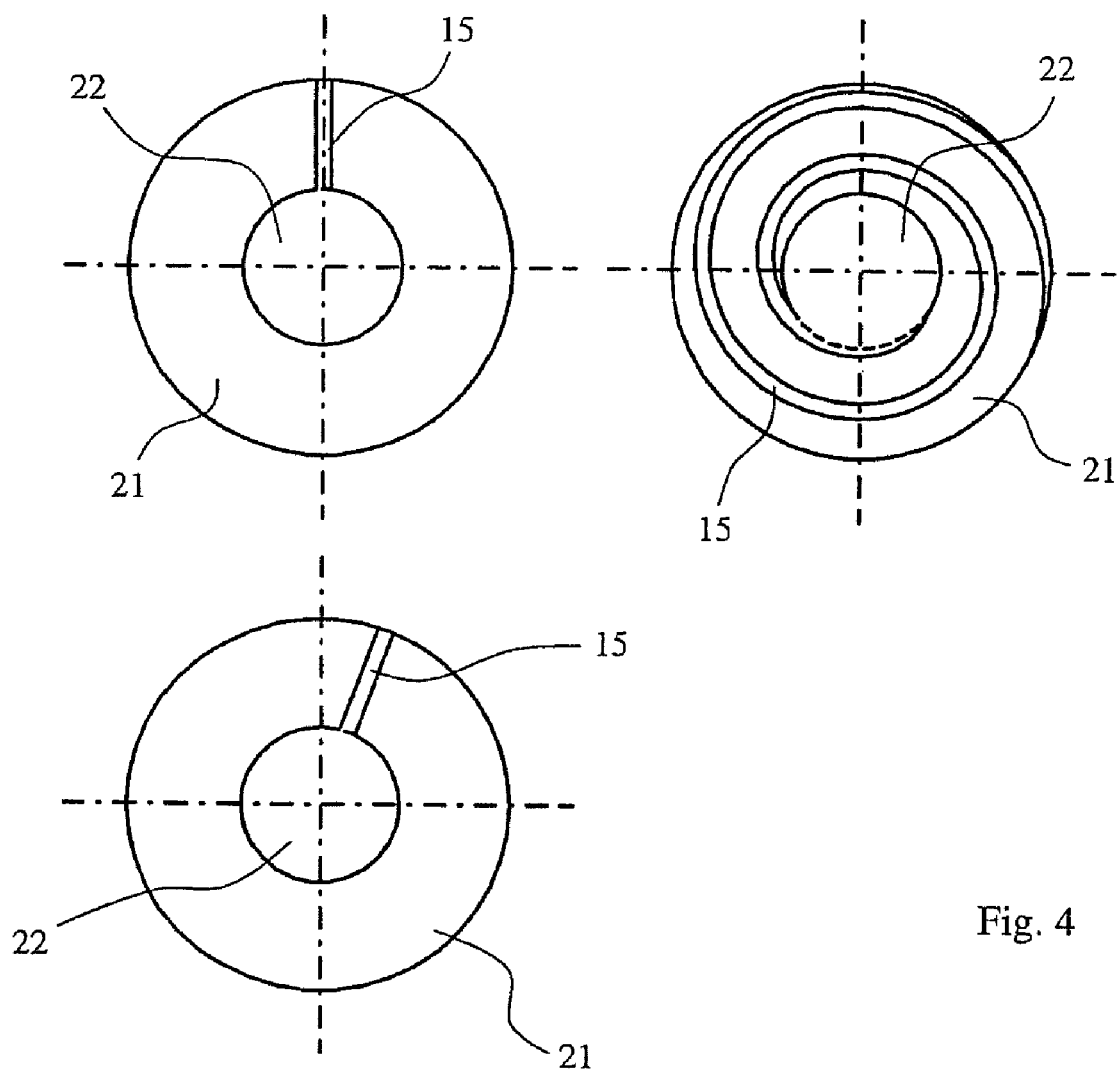
FIG. 4 is a plurality of top views of a ring with a plurality of groove shapes.

The gas-permeable connection 13 has at least one groove 14 formed on the jacket surface of pin 20 and at least one groove 15, which is formed in ring 21 and which is in connection with groove 14 in an air-permeable manner in the area of or in a continuous recess 22 formed in ring 21 (see FIG. 4). Groove 14, which extends especially axially, preferably extends now from a front side of the joint housing 8, which said front side faces the toothed rack 4, up to a front side of pin 20, which said front side faces away from the joint housing 8, and opens into the recess 6. Furthermore, groove 14 extends, at least in some sections, in or in the area of the external thread of pin 20. The at least one groove 15 extends especially from the recess 22 of the ring up to the outer jacket surface of ring 21 and opens into the recess 22 of the ring, on the one hand, and into the interior space 11 of the sealing bellows 10, which is not being shown here, on the other hand.

As an alternative, the at least one groove 15 may also end, starting from the recess 22 in the ring, at a radially spaced location from the contour of the outer circumference or the outer jacket surface of ring 21. The groove 15 is designed in this case as a limited groove, which can extend in the radial direction beyond an outer circumferential contour of a contact surface, by which the rod 4 is in contact with ring 21. The limited groove thus preferably ends between the outer circumferential contour of the contact surface and the outer circumferential contour of the ring.

Figure 3:
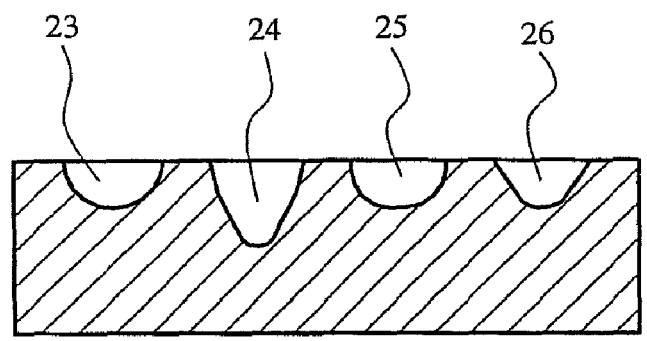
FIG. 3 is a cross sectional view of a plurality of groove profiles.
Figure 5:
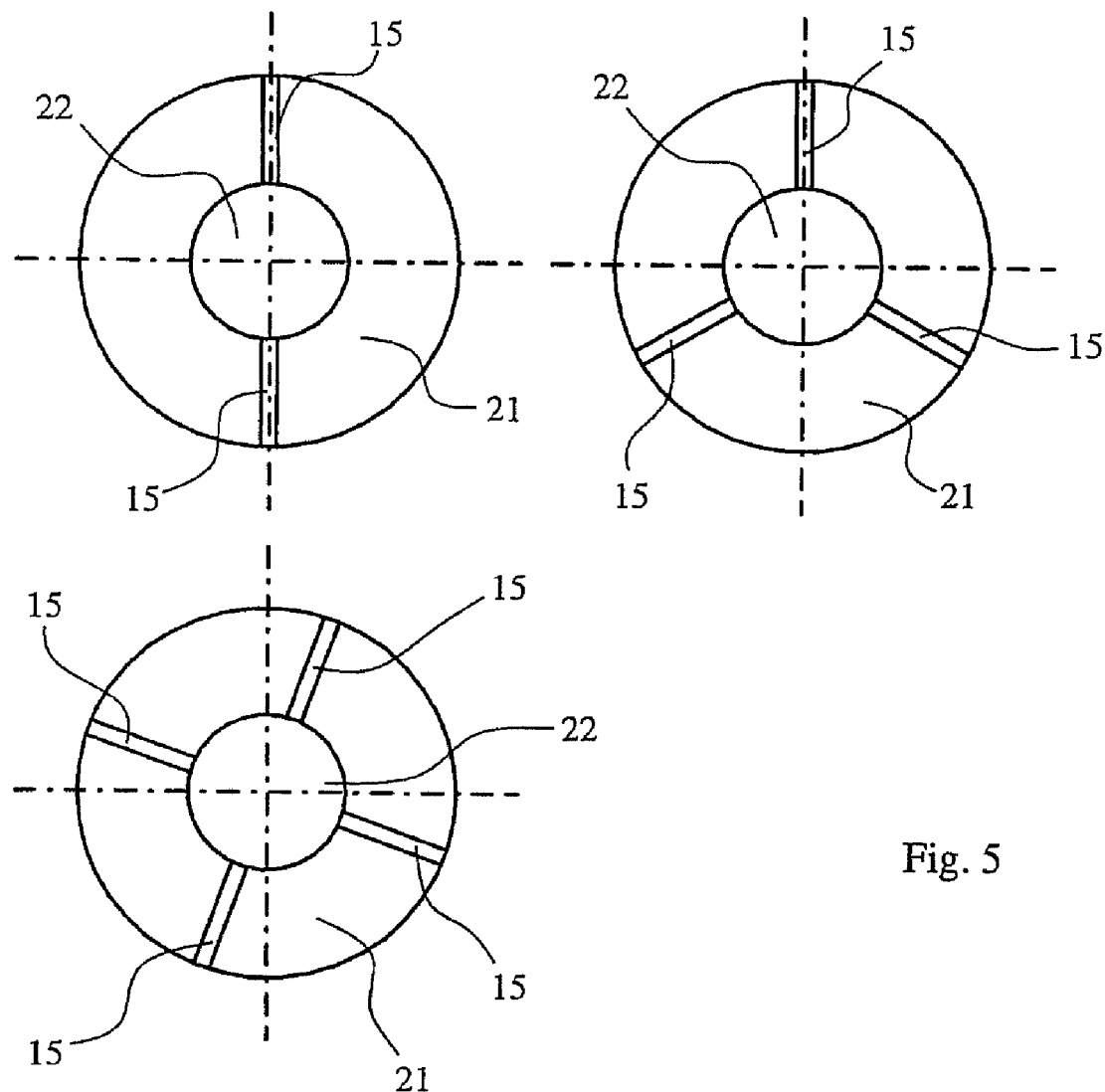
FIG. 5 is a plurality of top views of a ring with a different number of grooves.

The at least one groove 15 extends especially in the radial direction and may have one of the groove profile shapes 23, 24, 25 or 26 shown in FIG. 3 and/or one of the groove shapes shown in FIG. 4. It can be see especially in FIG. 4 that groove 15 may also extend in a helical pattern according to one variant of the embodiment. Furthermore, FIG. 5 shows that it is also possible to form a different number of grooves 15 in the ring element 21. The groove profile shapes, groove shapes and/or number of grooves shown in FIGS. 3, 4 and 5 are possible for the at least one groove 14.

Although not shown, a bearing shell, in which the joint ball 18 is mounted, may be arranged within the recess 16 between the joint ball 18 and the housing wall 17.

While specific embodiments of the invention have been shown and described in detail to illustrate the application of the principles of the invention, it will be understood that the invention may be embodied otherwise without departing from such principles.

The invention claimed is:

1. A joint arrangement for a vehicle, comprising:
a ball and socket joint including a joint housing and a pivot pin, said pivot pin being movable with respect to said joint housing, said joint housing comprising a joint housing pin, said joint housing pin having a surface defining at least a portion of an axially extending groove, said joint housing comprising a joint housing radial shoulder portion;
a rod having a cavity and an annular surface, said rod being connected to said ball and socket joint;
a ring element arranged between said ball and socket joint and said rod, said ring element having at least one radial groove and a ring element radial shoulder portion, said ring element having an outer ring element surface, said outer ring element surface being in contact with said joint housing;
a sealing bellows defining an interior space, said ball and socket joint being arranged at least partially in said interior space; and
a gas-permeable connection connecting said cavity of said rod to said interior space of said sealing bellows, at least a portion of said gas-permeable connection being formed by said at least one radial groove, said at least one groove being in communication with said interior space of said sealing bellows, said at least one radial groove being defined between said pin and at least a portion of said ring element radial shoulder portion, said at least one radial groove opening into said interior space at a radial position located outside said annular surface, wherein a fluid flow path is defined by said cavity, said at least one radial groove and said axially extending groove.

2. A joint arrangement in accordance with claim 1, wherein said ring element radial shoulder is located on a front side surface of said ring element, said front side surface of said ring element facing in a direction of said rod, said ring element being formed separate from said joint housing.

3. A joint arrangement in accordance with claim 1, wherein said axially extending groove is in communication with said at least one radial groove, wherein at least a portion of said axially extending groove extends within said rod such that said axially extending groove is in communication with said cavity of said rod, said annular surface of said rod comprising an exterior annular surface, at least a portion of said ring element radial shoulder being located at a position outside of said exterior annular surface, wherein at least a portion of said at least one radial groove is located at a position outside of said exterior annular surface.

4. A joint arrangement in accordance with claim 3, wherein said at least one radial groove is opposite said outer ring element surface, said ring element having an inner ring element surface, said inner ring element surface defining a joint housing pin opening, said joint housing pin extending through said joint housing pin opening of said ring element such that said cavity of said rod receives a portion of said joint housing pin, said surface of said joint housing pin and said ring element defining at least another portion of said axially extending groove, said inner ring element surface extending in a circumferential direction about said joint housing pin.

5. A joint arrangement in accordance with claim 4, wherein said joint housing pin has an external thread, said rod having an internal thread, said external thread of said joint housing pin engaging said internal thread of said rod such that said joint housing pin is connected to said rod, said axially extending groove being defined via said surface of said joint housing pin in one of said external thread and an area of said external thread.

6. A joint arrangement in accordance with claim 3, wherein said at least one radial groove extends along said ring element at a right angle to a longitudinal axis of said rod and said axially extending groove extends parallel to said longitudinal axis of said rod.

7. A joint arrangement in accordance with claim 1, wherein said rod is connected to a steering gear such that said rod is movable via said steering gear.

8. A joint arrangement in accordance with claim 7, wherein one end of said sealing bellows is sealingly in contact with one of said steering gear and a housing of said steering gear, another end of said sealing bellows being sealingly in contact with one of said pivot pin and a coupling member connected to said pivot pin.

9. A joint arrangement in accordance with claim 1, wherein said rod is a toothed rack.

10. A joint arrangement in accordance with claim 1, wherein said pivot pin is a ball pivot, said ball pivot including a joint ball, said ball pivot with said joint ball being rotatably and pivotably mounted in said joint housing.

11. A joint arrangement for a vehicle, comprising:
 a ball and socket joint including a joint housing and a pivot pin, said joint housing having a joint housing pin, said pivot pin being mounted for movement such that said pivot is movable with respect to said joint housing, said joint housing pin having a joint housing outer surface defining at least a portion of an axially extending groove;
 a rod having an inner rod surface defining a cavity and an exterior rod surface, said rod being connected to said ball and socket joint via said joint housing pin;
 a steering gear connected to said rod;
 a ring element arranged between said ball and socket joint and said rod, said ring element having a radial shoulder portion, said radial shoulder portion comprising a first outer ring surface defining at least one radially extending groove, said ring element having a second outer ring surface, said second outer ring surface engaging said joint housing, said first outer ring surface being opposite said second outer ring surface;
 a sealing bellows engaging said steering gear and said pivot pin such that said sealing bellows is movable from a compressed position to a stretched position, said sealing bellows defining an interior space, at least a portion of said ball and socket joint being located in said interior space, said at least one radially extending groove being in communication with said axially extending groove, said cavity and said interior space to define a fluid flow path, said axially extending groove and said at least one radially extending groove defining a gas-permeable connection, said interior space of said sealing bellows receiving gas from said cavity of said rod via said gas-permeable connection when said sealing bellows is in said stretched state, said cavity receiving gas from said interior space of said sealing bellows via said gas-permeable connection when said sealing bellows is in said compressed position, said at least one radially extending groove having an outer radially extending groove end portion, said outer radially extending groove end portion being located at a radial position located outside said exterior rod surface.

12. A joint arrangement in accordance with claim 11, wherein said first outer ring surface is located on a front side of said ring element, said first outer ring surface of said ring element being disposed opposite said rod, said first outer ring surface engaging at least a portion of said rod, said ring element being formed separate from said joint housing.

13. A joint arrangement in accordance with claim 11, wherein at least a portion of said axially extending groove extends within said cavity of said rod, said exterior rod surface comprising an exterior annular rod surface, at least a portion of said radial shoulder portion of said ring element being located at a radial position outside of said exterior annular rod surface.

14. A joint arrangement in accordance with claim 13, wherein an inner surface of said ring element defines a joint housing pin receiving opening, said joint housing pin extending through said joint housing pin receiving opening of said ring element such that said cavity of said rod receives a portion of said joint housing pin, said inner surface extending in a circumferential direction about said joint housing pin.

15. A joint arrangement in accordance with claim 14, wherein said joint housing outer surface defines an external thread at an end portion of said joint housing pin, said inner rod surface defining an internal thread, said external thread of said joint housing pin engaging said internal thread of said rod, said axially extending groove being defined via said joint housing outer surface in an area adjacent to said external thread.

16. A joint arrangement in accordance with claim 13, wherein said axially extending groove is substantially perpendicular to said at least one radially extending groove.

17. A joint arrangement in accordance with claim 11, wherein said rod is connected to said steering gear such that said rod is movable via said steering gear.

18. A joint arrangement in accordance with claim 11, wherein said rod is a toothed rack, said pivot pin being a ball pivot, said ball pivot including a joint ball, said ball pivot with said joint ball being rotatably and pivotably mounted in said joint housing.

19. A joint arrangement for a vehicle, comprising:
 a ball and socket joint including a joint housing and a pivot pin, said pivot pin being mounted for movement such that said pivot is movable with respect to said joint housing, said joint housing comprising a joint housing pin, said joint housing pin having a surface defining an axially extending groove;
 a rod having an outer rod surface and an inner rod surface defining a cavity, said rod being connected to said ball and socket joint;
 a steering gear connected to said rod;
 an annular element arranged between said ball and socket joint and said rod, said annular element comprising a first annular element outer surface and a radial shoulder portion having a second annular element outer surface, said second annular element outer surface engaging at least a portion of said rod, said first annular element engaging said joint housing, said second annular element outer surface defining at least one radially extending groove;

a sealing bellows engaging said steering gear and said pivot pin such that said sealing bellows is movable from a compressed position to a stretched position, said sealing bellows defining an interior space, wherein at least a portion of said ball and socket joint is located in said interior space, said at least one radially extending groove opening into said interior space at a radial position located outside said outer rod surface; and a gas transfer means for transferring gas from said interior space of said sealing bellows to said cavity of said rod with said sealing bellows in said compressed position and for transferring gas from said cavity of said rod to said interior space of said sealing bellows with said sealing bellows in said stretched position, said gas transfer means comprising said axially extending groove and said at least one radially extending groove.

20. A joint arrangement in accordance with claim 19, wherein said first annular element outer surface is opposite said second annular element outer surface, said axially extending groove being in communication with said cavity, said interior space and said at least one radially extending groove to define a fluid flow path, at least a portion of said annular element defining at least a portion of said axially extending groove, said annular element being formed separate from said joint housing, said outer rod surface comprising an exterior annular surface, at least a portion of said radial shoulder portion of said annular element being located at a position outside of said exterior annular surface.

* * * * *